United States Patent Office 3,755,455
Patented Aug. 28, 1973

3,755,455
(1-ALKOXY-2-NAPHTHYL)-SUBSTITUTED OR UNSUBSTITUTED PHENYLKETONES
William J. Houlihan, Mountain Lakes, N.J., assignor to Sandoz-Wonder, Inc., Hanover, N.J.
No Drawing. Filed Dec. 9, 1970, Ser. No. 96,668
Int. Cl. C07c 49/80, 49/82
U.S. Cl. 260—591    3 Claims

ABSTRACT OF THE DISCLOSURE (1-alkoxy - 2 - naphthyl)-substituted or unsubstituted phenylketone, e.g., (1-methoxy-2-naphthyl)-phenylketone, prepared by oxidizing a corresponding 1-alkoxy-2-phenyl-2-naphthalenemethanol. The compounds are useful as anti-inflammatory agents.

---

This invention relates to substituted naphthyl substituted or unsubstituted phenylketones. More particularly, it relates to (1-alkoxy-2-naphthyl)-substituted or unsubstituted phenylketones, intermediates thereof and to processes for their preparation.

The compounds of this invention may be represented by the following structural formula

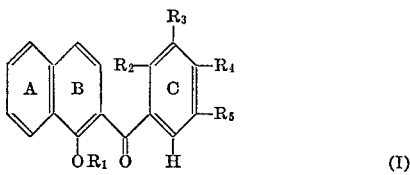

where $R_1$ is straight chain lower alkyl having 1 to 4 carbon atoms, e.g., methyl, ethyl, propyl, or butyl, $R_2$, $R_3$, $R_4$, $R_5$ are independently hydrogen, halo having an atomic weight of 19 to 36, lower alkyl having 1 to 4 carbon atoms, e.g., methyl, ethyl, propyl, isopropyl, butyl or isobutyl, lower alkoxy having 1 to 4 carbon atoms, e.g., methyl, ethyl, propyl, isopropyl, butyl or isobutyl, or $R_2$ and $R_3$, $R_3$ and $R_4$, or $R_4$ and $R_5$ together are methylenedioxy, provided that the maximum number of substituents other than hydrogen on ring C is two.

The compounds of Formula I may be prepared by oxidizing under conventional reaction conditions a compound of the formula

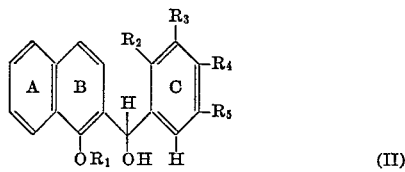

wherein $R_1$, $R_2$, $R_3$, $R_4$ and $R_5$ have the above-stated significance, with conventional oxidation reagents such as chromiumtrioxide, sodium dichromate, dichlorodicyanobenzoquinone and the like (Scheme A).

The compounds of Formula I may also be prepared by hydrolyzing a compound of the formula

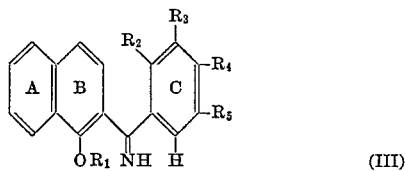

wherein $R_1$, $R_2$, $R_3$, $R_4$ and $R_5$ have the above-stated significance, under conventional reaction conditions and with conventional hydrolyzing agents preferably such as aqueous hydrochloric acid (Scheme B).

The compounds of Formula I may also be prepared by the following reaction Scheme C:

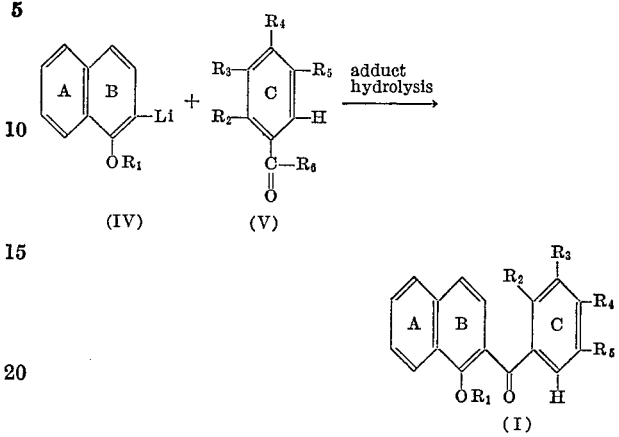

wherein $R_1$, $R_2$, $R_3$, $R_4$ and $R_5$ have the above-stated significance and $R_6$ is chloro, bromo, or $OR_7$ where $R_7$ is straight chain lower alkyl having 1 to 4 carbon atoms, e.g., methyl, ethyl, propyl or butyl.

The compounds of Formula I are prepared by treating a 2-lithium-1-alkoxynaphthalene of Formula IV with a compound of Formula V under an inert atmosphere, e.g., nitrogen, in an inert solvent such as diethylether, dibutylether, tetrahydrofuran, hexane, pentane, cyclohexane and the like at a temperature of from −20° to 45° C., preferably −10° to 15° C. for about 0.5 to 6.0 hours and hydrolyzing the resulting adduct, preferably with aqueous ammonium chloride. Compound V is preferably added in an inert solvent (as described above) to a cold (−5° to 5° C.) inert solvent solution of Compound IV. Neither the solvents nor the temperatures used are critical.

The compounds of Formula II may be prepared by the following reaction Scheme D:

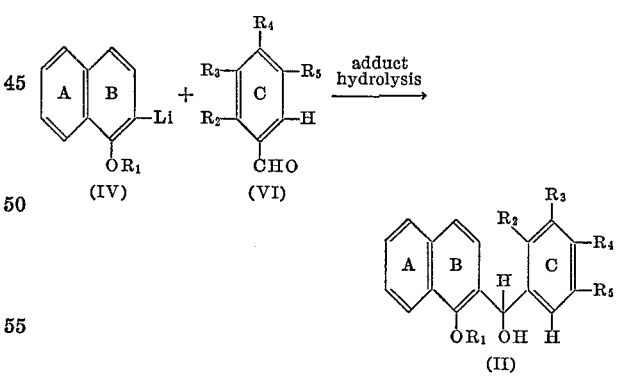

wherein $R_1$, $R_2$, $R_3$, $R_4$ and $R_5$ have the above-stated significance.

The compounds of Formula II are prepared by treating a 2-lithium-1-alkoxynaphthalene of Formula IV with a substituted or unsubstituted benzaldehyde of Formula VI under an inert atmosphere, e.g., nitrogen, in an inert solvent such as diethylether, dibutylether, tetrahydrofuran, hexane, pentane, cyclohexane and the like at a temperature of from −20° to 45° C., preferably −10° to 15° C. for about 0.5 to 24 hours, and subsequently hydrolyzing the resulting adduct, preferably with aqueous ammonium chloride. Compound IV is preferably added in an inert solvent (as described above) to a cold (−5° to 5° C.) inert solvent solution of Compound III. Neither the solvents nor the temperatures used are critical.

The compounds of Formula III may be prepared by the following reaction Scheme E:

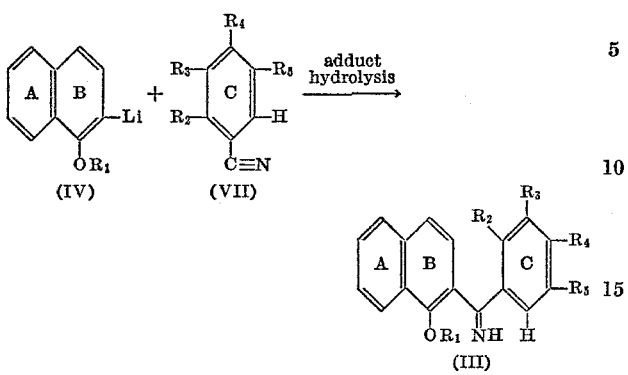

wherein $R_1$, $R_2$, $R_3$, $R_4$ and $R_5$ have the above-stated significance.

The compounds of Formula III are prepared by treating a 2-lithium-1-alkoxynaphthalene of Formula IV with a compound of Formula VII in an inert atmosphere, e.g., nitrogen, in an inert solvent such as tetrahydrofuran, hexane, toluene, diethyl ether and the like, at a temperature of from 0° to 45° C., preferably 15° to 25° C. for about 2 to 24 hours and hydrolyzing the resulting adduct, preferably with aqueous ammonium chloride. Compound VII is preferably added in an inert solvent (as described above) to a cold (−5° to 5° C.) inert solvent solution of Compound IV. Neither the solvents nor the temperatures used are critical.

It is understood by those skilled in the art that the compounds of Formula I can also be prepared by hydrolyzing the reaction product of the compounds of Formulas IV and VII with an excess of a hydrolyzing agent such as aqueous hydrochloric acid.

The compounds of Formulas I and II may be recovered using conventional recovery techniques such as crystallization.

Certain of the compounds of Formulas IV, V, VI and VII are known and may be prepared according to methods disclosed in the literature. Those compounds of Formulas IV, V, VI and VII not specifically disclosed are prepared according to analogous methods from known materials.

The compounds of Formula I are useful because they possess pharmacological activities in animals. More particularly, the compounds are useful as anti-inflammatory agents. The compound of Example III is a particularly useful anti-inflammatory agent. This anti-inflammatory activity is indicated by the activity in the rat given 6–25 mg./kg. of the active material and tested using the adjuvant arthritic procedure substantially as described by Perrine, J. W. Takesue, E. I. (Arch. Int. Pharmacodyn., 174; 192, 1968). For such usage, the compounds may be administered orally, parenterally or topically, and may be combined with a pharmaceutically acceptable carrier or adjuvant.

The dosage of active ingredient employed for the alleviation of inflammation may vary depending on the severity of the condition being treated. However, in general, satisfactory results are obtained when a compound of Formula I is administered at a daily dosage of from about 1 milligram to about 100 milligrams per kilogram of animal body weight, preferably given in divided doses 2 to 4 times a day, or in sustained release form. For most larger mammals (e.g., primates) the total daily dosage is from about 75 to about 750 milligrams. Dosage forms suitable for internal use comprise from about 19 to about 375 milligrams of the active compound, in intimate admixture with a solid or liquid pharmaceutically acceptable carrier or diluent.

A representative formulation suitable for oral administration is a capsule prepared by standard techniques which contains the following:

| Ingredients: | Parts by weight |
|---|---|
| 1-methoxy-2-naphthyl-phenylketone | 50 |
| Inert filler (e.g., starch, kaolin, lactose, etc.) | 250 |

EXAMPLE 1

1-methoxy-α-phenyl-2-naphthalenemethanol

Charge to a flask equipped with a stirrer, dropping funnel and maintained under a nitrogen blanket, 155 ml. (0.25 mole) of 15% n-butyllithium in hexane, 50 ml. of anhydrous cyclohexane, 29 g. (0.25 mole) N,N,N',N'-tetramethylethyldiamine. Cool in an ice bath and with stirring add in about 15 minutes a solution of 39.5 g. (0.25 mole) 1-methoxy-naphthalene and 100 ml. of cyclohexane. Remove the ice bath and continue stirring for an additional 2 hours. Cool again in an ice bath and add in about 0.5 hour a solution of 26.5 g. (0.25 mole) benzaldehyde and 100 ml. cyclohexane. Stir overnight at room temperature and to the resulting adduct add 75 ml. of saturated ammonium chloride followed by about 100 g. of anhydrous sodium sulfate. Filter off the salts, concentrate on a rotary evaporator and distill to give 1-methoxy-α-phenyl-2-naphthalenemethanol, B.P. 197° at 3.25 mm. as a viscous oil (a compound of Formula II).

By using the above conditions and in place of benzaldehyde, and starting with (1) p-chlorobenzaldehyde, (2) p-tolylaldehyde or (3) p-anisylaldehyde, the following compounds of Formula II are obtained:

(1) 1-methoxy-α-4'-chlorophenyl-2-naphthalenemethanol, B.P. 210–220° at 2.5 mm.,
(2) 1-methoxy-α-4'-tolylphenyl-2-naphthalenemethanol, B.P. 210° at 3.5 mm., or
(3) 1-methoxy-α-4'-anisylphenyl-2-naphthalenemethanol, B.P. 240° at 4.0 mm.

EXAMPLE 2

By using the conditions of Example 1 and in place of benzaldehyde, and starting with (1) 3,5-dichlorobenzaldehyde
(2) 3,5-dimethylbenzaldehyde
(3) 3,5-dimethoxybenzaldehyde
(4) o-chlorobenzaldehyde
(5) o-tolylaldehyde
(6) o-anisylaldehyde, or
(7) 2,3-methylenedioxybenzaldehyde the following compounds of Formula II are obtained:

(1) 1-methoxy-α-3,5-dichlorophenyl-2-naphthalenemethanol
(2) 1-methoxy-α-3,5-dimethylphenyl-2-nnaphthalenemethanol
(3) 1-methoxy-α-3,5-dimethoxyphenyl-2-naphthalenemethanol
(4) 1-methoxy-α-2'-chlorophenyl-2-naphthalenemethanol
(5) 1-methoxy-α-2'-tolylphenyl-2-naphthalenemethanol
(6) 1-methoxy-α-2'-anisylphenyl-2-naphthalenemethanol, or
(7) 1-methoxy-α-2,3-methylenedioxyphenyl-2-naphthalenemethanol

EXAMPLE 3

1-methoxy-2-naphthyl-phenylketone

Charge to a flask equipped with a thermostat stirrer, dropping funnel and condenser 26.4 (0.10 mole) of 1-methoxy-α-phenyl-2-naphthalenemethanol from Example 1 and 250 ml. of glacial acetic acid. Stir at room temperature and add dropwise a solution of 10.0 g. (0.10 mole) chromium trioxide in 120 ml. H₂O at such a rate that the internal temperature does not exceed 35°. Stir for an additional 3 hours at room temperature and then pour into ice-water mixture and then make basic to litmus by addition of 50% sodium hydroxide. Extract the organic material with benzene, dry with anhydrous sodium sulfate, filter and concentrate the filtrate on a rotary evaporator. Chromatograph the residue on a silica gel column (benzene eluent) and crystallize from pentane to obtain the product 1-methoxy-2-naphthyl-phenylketone, M.P. 70°–72° C. (a compound of Formula I).

By using the above conditions and in place of 1-methoxy-α-phenyl-2-naphthalenemethanol and starting with the appropriate compound of Formula II of Example 1, the following products of Formula I are obtained:

(1) 1-methoxy-2-naphthyl-4'-chlorophenylketone, M.P. 92°–94° C.
(2) 1-methoxy-2-naphthyl-4'-tolylketone, M.P. 111°–112° C., or
(3) 1-methoxy-2-naphthyl-4'-anisylketone, M.P. 67°–68° C.

EXAMPLE 4

By using the conditions of Example 3 and in place of 1-methoxy-α-phenyl-2-naphthalenemethanol and starting with the appropriate compound of Formula II of Example 2, the following products of Formula I are obtained:

(1) 1-methoxy-2-naphthyl-3,5-dichlorophenylketone
(2) 1-methoxy-2-naphthyl-3,5-dimethylphenylketone
(3) 1-methoxy-2-naphthyl-3,5-dimethoxyphenylketone
(4) 1-methoxy-2-naphthyl-2'-chlorophenylketone
(5) 1-methoxy-2-naphthyl-2'-tolylketone
(6) 1-methoxy-2-naphthyl-2'-anisylketone or
(7) 1-methoxy-2-naphthyl-2,3-methylenedioxyphenyl ketone.

EXAMPLE 5

1-methoxy-2-naphthyl-phenylketone

Charge to a flask equipped with a stirrer, dropping funnel and maintained under a nitrogen blanket, 155 ml. (0.25 mole) of 15% n-butyllithium in hexane, 50 ml. of anhydrous cyclohexane, 29 g. (0.25 mole) N,N,N',N'-tetramethylethyldiamine. Cool in an ice bath and with stirring add in about 15 minutes a solution of 39.5 g. (0.25 mole) 1-methoxynaphthalene and 100 ml. of cyclohexane. Remove the ice bath and continue stirring for an additional 2 hours. Cool again in an ice bath and add in about 0.5 hour a solution of 35 g. (0.25 mole) benzoylchloride and 100 ml. cyclohexane. Stir overnight at room temperature and to the resulting adduct add 75 ml. of saturated ammonium chloride followed by about 100 g. of anhydrous sodium sulfate. Filter off the salts, concentrate on a rotary evaporator. The residue is crystallized from pentane to give 1-methoxy-2-naphthyl-phenylketone, M.P. 70°–72° C. (a compound of Formula I).

EXAMPLE 6

1-methoxy-2-naphthyl-phenylketone

Charge to a flask equipped with a stirrer, dropping funnel and maintained under a nitrogen blanket, 155 ml. (0.25 mole) of 15% n-butyllithium in hexane, 50 ml. of anhydrous cyclohexane, 29 g. (0.25 mole) N,N,N',N'-tetramethylethyldiamine. Cool in an ice bath and with stirring add in about 15 minutes a solution of 39.5 g. (0.25 mole) 1-methoxy-naphthalene and 100 ml. of cyclohexane. Remove the ice bath and continue stirring for an additional 2 hours. Cool again in an ice bath and add in about 0.5 hour a solution of 26.5 g. (0.25 mole) benzonitrile in 100 ml. of cyclohexane. Stir overnight at room temperature and to the resulting adduct add 75 ml. of saturated ammonium chloride followed by about 100 g. of anhydrous sodium sulfate. Filter off the salts and concentrate on a rotary evaporator. To the residue add 25 ml. of 2 N hydrochloric acid with stirring, reflux for 3 hours, cool to room temperature and then extract with 250 ml. of methylene chloride. The organic layer is separated and dried with 50 g. of anhydrous magnesium sulfate. Filter off the salts, concentrate on a rotary evaporator and crystallize the residue with pentane to give the product 1-methoxy - 2-naphthyl-phenylketone, M.P. 70°–72° C. (a compound of Formula I).

What is claimed is:
1. The compound which is 1-methoxy-2-naphthyl-4'-chlorophenylketone.
2. The compound which is 1-methoxy-2-naphthyl-4'-tolylketone.
3. The compound which is 1-methoxy-2-naphthyl-4'-anisylketone.

References Cited

Richtzenhain et al., Chem. Abstracts 44, 1933 i (1950).
Desai et al., Chem. Abstracts 50, 14673 a (1956).
Lapkin et al., Chem. Abstracts 66, 85624 s (1967).

DANIEL D. HORWITZ, Primary Examiner

U.S. Cl. X.R.

260—618 D, 618 F, 566 R; 424—331